Figure 1:
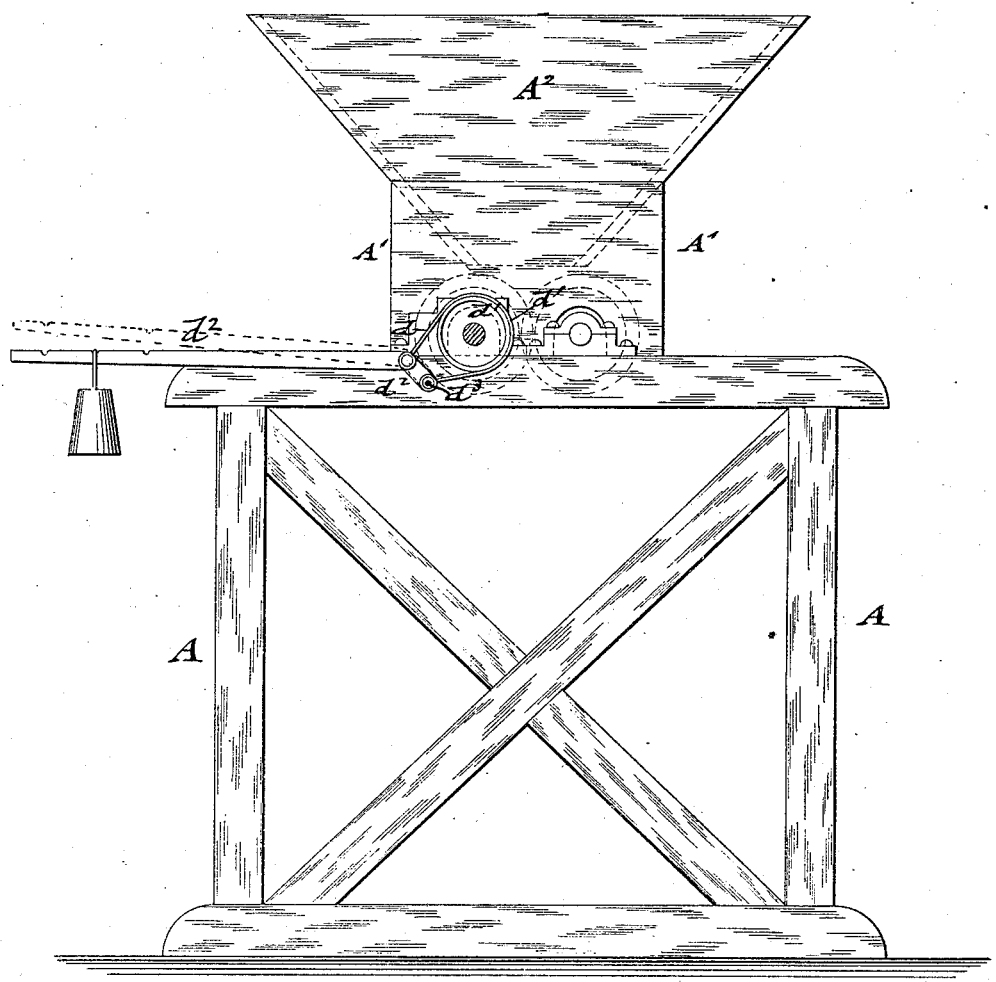

(No Model.) 2 Sheets—Sheet 1.

J. MÜLLER.
MACHINE FOR SEPARATING HOP SCALES FROM THEIR STEMS.

No. 285,150. Patented Sept. 18, 1883.

WITNESSES:
A. Schehl.
Carl Karp.

INVENTOR
Jacob Müller
BY Gospel & Raegener
ATTORNEYS.

(No Model.) 2 Sheets—Sheet 2.
J. MÜLLER.
MACHINE FOR SEPARATING HOP SCALES FROM THEIR STEMS.
No. 285,150. Patented Sept. 18, 1883.
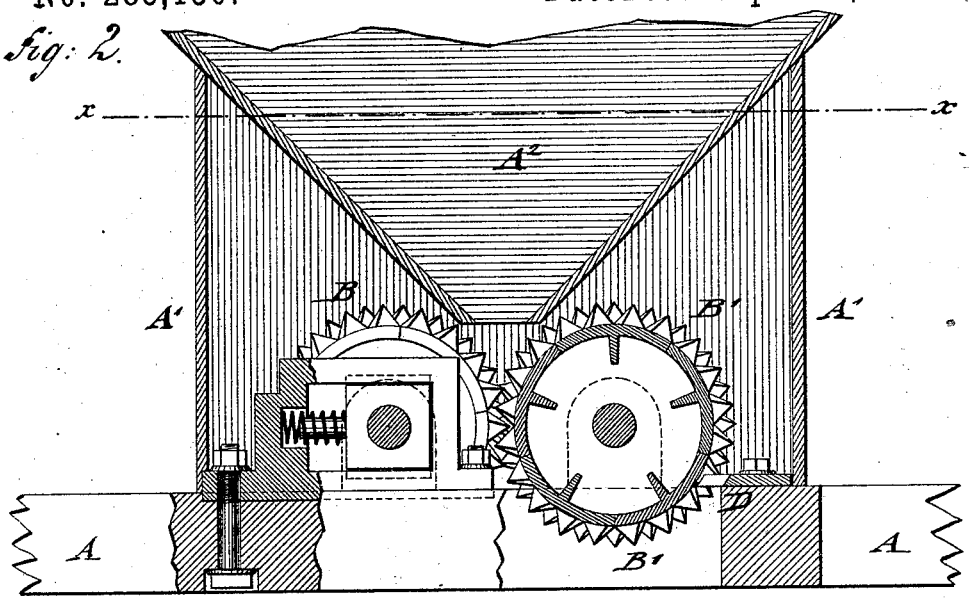
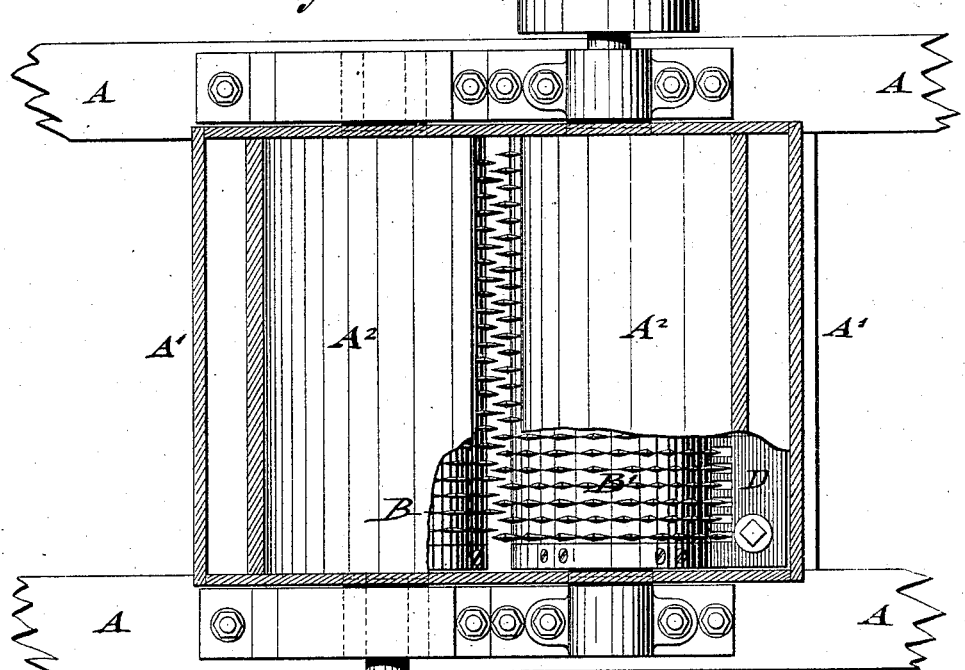
WITNESSES:
A. Schehl
Carl Karp
INVENTOR
Jacob Müller
BY Goepel & Raegener
ATTORNEYS.

UNITED STATES PATENT OFFICE.

JACOB MÜLLER, OF NEW YORK, N. Y.

MACHINE FOR SEPARATING HOP-SCALES FROM THEIR STEMS.

SPECIFICATION forming part of Letters Patent No. 285,150, dated September 18, 1883.

Application filed June 4, 1883. (No model.)

*To all whom it may concern:*

Be it known that I, JACOB MÜLLER, of the city, county, and State of New York, have invented certain new and useful Improvements in Machines for Separating Hop-Scales from their Stems, of which the following is a specification.

This invention has reference to an improved machine for separating hop-scales from their stems, so that the aroma and bitter principle contained in the hops can be extracted more perfectly than when the hops are treated in an unbroken state; and the invention consists of two rollers having alternating rows of teeth or projections, the bearings of one roller being spring-cushioned and the shaft of the same provided with a retaining brake device, while the second roller receives rapid revolving motion from a power-shaft. The hops are fed to the space between the teeth of the same, which are sharpened at one side. A fixed comb clears the teeth of the revolving roller of adhering hop-scales and prevents choking up the same.

In the accompanying drawings, Figure 1 represents a side elevation of my improved machine for separating hop-scales from their stems. Fig. 2 is a vertical longitudinal section; and Fig. 3 is a horizontal section on line $x\,x$, Fig. 2. Fig. 4 is a detail view of a tooth of one of the rollers.

Similar letters of reference indicate corresponding parts.

A in the drawings represents the supporting-frame upon which the casing A', that incloses the working parts of my machine, is mounted. The casing is provided with a hopper, $A^2$. At the interior of the casing A' are arranged two rollers, B B', the shafts of which are supported in bearings of frame A. To the outer end of the shaft of the roller B is applied a brake, C, which consists of a brake-band, $d$, that is passed around a pulley, $d'$, and applied to the end of a weighted lever, $d^2$, said lever being fulcrumed to frame A at $d^3$, as shown in Fig. 1. The second roller, B', is rapidly revolved by a belt-and-pulley transmission from a suitable power-shaft. The rollers B B' are each provided on their circumference with longitudinal rows of projecting and pointed teeth $b$, which are preferably diamond-shaped, or nearly so, in cross-section, and sharpened on one edge, the teeth of each longitudinal row of each roller being opposite the spaces between the teeth of the adjoining longitudinal rows of the same roller, and the circumferential rows of one roller being opposite the spaces between the circumferential rows of the other roller. The rollers are located close together, so that the teeth of one roller pass through the interstices between the teeth of the other roller. By alternating the circumferential rows of the respective rollers, the teeth of one are allowed to pass freely between the teeth of the other, and by alternating the teeth of the longitudinal rows of each roller a more regular and effective separating action of the rollers on the material passed through the same is obtained. The bearings of the shaft of roller B' are secured in fixed position to the frame A, while the shaft-bearings of the roller B are movable in guide-casings $e$, and are cushioned by strong spiral or other springs $e'$, as shown in Fig. 2. By thus cushioning the shaft of roller B any coarse impurities—such as nails or other articles—that have been accidentally packed with the hops may be passed through the rollers without injury to the same, as the roller B' instantly "gives," and turns sufficiently to permit such obstructions to pass.

The hops are fed by the hopper $A^2$ to the rollers B B' and taken up by the teeth of the same, being rapidly drawn by the teeth of the revolving roller B' through the small interstices between the teeth of the roller B. The hops are thereby exposed to the action of the teeth of the rollers B B', whereby the catkins are opened and the scales separated from the stems without being torn or cut up into small pieces or shreds. The brake C retains the roller B in fixed position, so that one longitudinal row of teeth at the time only works in connection with the teeth of the revolving roller B'. This row of teeth becomes gradually filled up with resinous and adhering parts of the hops—such as stems, scales, &c.—so that it is necessary to expose from time to time a new longitudinal row of teeth of the stationary roller to the action of the teeth of the revolving roller, for which purpose the shaft of the roller B is provided at its outer end with a hand-wheel, $B^2$, against the friction of the brake, whereby the next adjoining longitudinal row of teeth is brought into action. This is next filled with resinous parts, after which the roller B is again turned by the hand-wheel for the distance of one tooth, and so on until all the longitudinal rows of teeth on the roller B are partly or entirely filled up. The machine is then stopped for cleaning the interstices between the teeth of the stationary roller B, or the supply of hops is interrupted and the longitudinal rows of teeth of the stationary roller B exposed successively to the clearing action of the teeth of the rapidly-revolving roller B', whereby all the adhering parts of the hops are removed without difficulty. Any hops adhering to the revolving roller B' are removed from the same by a fixed transverse comb, D, that is secured to the supporting-frame A, as shown in Figs. 2 and 3.

By the machine described the hops may be separated in a perfect manner from their stems without cutting up the individual scales, so that the resin contained therein is more fully utilized in the boiling of the hops, and thereby a richer and more aromatic extract obtained therefrom.

Having thus described my invention, I claim as new and desire to secure by Letters Patent—

1. The combination of a roller, spring-cushioned bearings supporting the shaft of said roller, a brake device applied to said shaft, and a rapidly-revolving roller, both rollers being provided with alternating circumferential rows of projecting teeth sharpened at one side, the teeth of one roller passing through the interstices between the teeth of the other roller, substantially as set forth.

2. The combination of a hopper, $A^2$, a revolving roller, B', a roller, B, movable and spring-cushioned bearings for roller B, a brake device, C, applied to the shaft of said roller, and a hand-wheel, $B^2$, at the outer end of the shaft of the roller B, for axially turning the same, said rollers being provided with circumferential rows of pointed teeth beveled at one side, the teeth of one roller passing through the interstices of the other roller, all substantially as set forth.

3. The combination of the hopper $A^2$, spring-cushion roller B, brake device C, applied to the shaft of roller B, revolving roller B', both rollers having alternating rows of circumfertial teeth sharpened at one side, and a fixed transverse comb, D, that clears the substances adhering to the teeth of the revolving roller B', all substantially as set forth.

In testimony that I claim the foregoing as my invention I have signed my name in presence of two subscribing witnesses.

JACOB MÜLLER.

Witnesses:
PAUL GOEPEL,
CARL KARP.